Patented Aug. 11, 1925.

1,549,207

UNITED STATES PATENT OFFICE.

HOWARD R. MINER, OF LOS ANGELES, CALIFORNIA, ASSIGNOR TO CALIFORNIA CYANIDE COMPANY, INCORPORATED, OF NEW YORK, N. Y., A CORPORATION OF DELAWARE.

CARBURIZATION OF METALS.

No Drawing.   Application filed February 15, 1924.   Serial No. 693,126.

*To all whom it may concern:*

Be it known that I, HOWARD R. MINER, a citizen of the United States, residing at Los Angeles, in the county of Los Angeles, State of California, have invented certain new and useful Improvements in the Carburization of Metals; and I do hereby declare the following to be a full, clear, and exact description of the invention, such as will enable others skilled in the art to which it appertains to make and use the same.

This invention relates to the carburization of metals usually referred to as "case-hardening", and particularly to a method of case-hardening and a composition for use therein.

Case-hardening as heretofore conducted consists of the treatment of the metal, usually steel, under the influence of heat with various materials including liquids, solids and gases, but the present invention relates to the use of solid compositions in the process. Heretofore carbonaceous materials combined with energizers have been employed and the metals have also been subjected to the action of cyanides. The carbonaceous materials may be of various kinds, but it has been considered necessary to employ relatively expensive materials such as charred bone and charred leather. In case-hardening with cyanides the cyanide material has been mixed with materials such as sodium carbonate and sodium chloride.

It is the object of the present invention to improve the process of case-hardening and to provide a relatively inexpensive and effective composition in which the advantageous properties of carbon and cyanide in effecting the surface hardening of metals are combined.

It has been discovered that a mixture containing carbon, and particularly gas or petroleum carbon, which is thoroughly impregnated with cyanide with or without other constituents, is the most effective case-hardening agent. The mechanism of the case-hardening process is little understood and it is impossible to point out the reasons for the advantages of a composition such as that described. However, the composition is relatively inexpensive and furnishes a most effective agent for the treatment of steel for the purpose of producing a hardened surface thereon.

The preferred composition includes sodium cyanide approximately 25%, sodium carbonate approximately 20%, caustic soda approximately 10%, and carbon approximately 45%. The exact proportions may vary, and the caustic soda, for example, may be eliminated. The effective carburizing agents are apparently sodium cyanide and carbon, the sodium carbonate acting as an energizer. To accomplish the best results it is desirable that the carbon be thoroughly impregnated with the cyanide.

To ensure this result the mixture is preferably prepared by synthesizing the cyanide directly in the mixture. Thus, when a mixture consisting of approximately 50 parts of sodium carbonate, 50 parts of coke or gas or petroleum carbon, with a limited quantity of iron preferably in the neighborhood of 2% in the form of iron oxide, is heated to a temperature of approximately 1100° C. while a stream of nitrogen or nitrogenous gases is passed therethrough, the nitrogen is fixed in the form of cyanide and a furnace product is obtained which closely approximates in composition the material hereinbefore described. The proportion of cyanide in the furnace product will vary depending upon the time allowed for the reaction, and this permits the regulation of the proportion of cyanide depending upon the character of the work to be accomplished. The cyanide is intimately distributed through the carbon and in this condition is most effective in accomplishing the desired results.

The mixture might be prepared by adding sodium cyanide, for example, to a mixture of sodium carbonate and carbon and then furnacing the mixture until the carbon is sufficiently impregnated with the cyanide. Also a cyanide solution could be added to the carbon until the latter is thoroughly impregnated. The impregnated carbon could then be mixed with soda ash and dried, for example, by vacuum evaporation. In either of the latter processes the proper amount of cyanide to supply a mixture of given composition would be added to the carbon.

The case-hardening process consists in introducing the articles to be treated in a suitable box or container which is capable of withstanding the effect of high temperatures and surrounding the articles in the box with the case-hardening mixture as hereinbefore described. The box with the articles therein is then subjected to the effect of thorough heating at temperatures in the neighborhood of 900 to 950° C. The time and temperature of the heat depend upon the character of the articles and the amount of hardening which is to be imparted thereto. Obviously no definite period can be stated.

At the conclusion of the heating the articles are permitted to cool in the boxes and are then removed therefrom. After cleaning they are found to have a hardened surface which is adapted to withstand abrasion while the interior portions of the articles are tough and consequently resistant to the effect of shocks.

It is to be understood that by reference to sodium cyanide, sodium carbonate and sodium hydroxide herein I intend to include corresponding salts of other alkali metals although sodium salts are less expensive and consequently best adapted to the accomplishment of the present purpose. The limits to the proportions of the several ingredients cannot be definitely stated as they will vary depending upon the character of the work to be done. As an approximation of the proper proportions it may be stated that the following compositions are suitable:

|  | Per cent. |
|---|---|
| Sodium cyanide | 5 to 50 |
| Sodium carbonate | 25 to 5 |
| Sodium hydroxide | 0 to 15 |
| Carbon | 20 to 60 |

Various details of the proportion, composition and utilization of the case-hardening composition may be varied without departing from the invention or sacrificing the advantages thereof which are the rapidity of the case-hardening operation, the assurance of a hardened coating of the desired character and the relative inexpensiveness of the material and of the process in which it is utilized.

I claim:—

1. A carburizing composition including carbon impregnated with an alkali metal cyanide.

2. A carburizing composition including carbon impregnated with an alkali metal cyanide and combined with an energizer.

3. A carburizing composition including carbon impregnated with an alkali metal cyanide and combined with an alkali metal carbonate.

4. A carburizing composition including carbon impregnated with an alkali metal cyanide and combined with an alkali metal carbonate and an alkali metal hydroxide.

5. A carburizing composition including carbon impregnated with from 5 to 50% of an alkali metal cyanide.

6. The method of carburizing metals, which comprises subjecting the metal to heat in contact with a carburizing composition including carbon impregnated with an alkali metal cyanide.

7. A carburizing composition comprising not more than 25% of carbon in intimate association with an alkali metal cyanide.

In testimony whereof I affix my signature.

HOWARD R. MINER.